United States Patent [19]
Korosue

[11] Patent Number: 4,506,900
[45] Date of Patent: Mar. 26, 1985

[54] LEVER-OPERATED TYPE OF WHEELCHAIR

[76] Inventor: Akira Korosue, 6-604, 19, Tashiro-Cho, Nishinomiya-City, Hyogo-Ken, Japan

[21] Appl. No.: 413,263

[22] Filed: Aug. 31, 1982

[30] Foreign Application Priority Data

Nov. 26, 1981 [JP] Japan .................... 56-190091

[51] Int. Cl.³ .............................................. B62M 1/16
[52] U.S. Cl. ............................ 280/242 WC; 74/142;
192/41 S; 192/72; 192/81 C; 280/238; 280/244;
297/DIG. 4
[58] Field of Search .............. 280/242 WC, 243, 244,
280/289 WC, 7.15, 200, 252, 237, 236, 238;
180/6.5, DIG. 3; 297/DIG. 4; 192/41 S, 72, 75,
81 C; 74/142

[56] References Cited
U.S. PATENT DOCUMENTS 2,951,568  9/1960  Hungerford, Jr. et al. ....... 192/41 S
3,994,509  11/1976  Schaeffer ..................... 280/244 X
4,358,126  11/1982  Mitchell et al. .......... 297/DIG. 4 X

FOREIGN PATENT DOCUMENTS 2369960  7/1978  France ...................... 280/242 WC
386358  1/1933  United Kingdom ............. 192/41 S
556940  10/1943  United Kingdom ............. 192/41 S Primary Examiner—Joseph F. Peters, Jr.
Assistant Examiner—Mitchell J. Hill
Attorney, Agent, or Firm—Koda and Androlia

[57]                        ABSTRACT

A lever-operating type wheelchair includes a differential link mechanism connected to an operational lever, a pair of forward/backward clutch mechanisms driven to interlock with the link mechanism, and an expansion joint mechanism provided between the link mechanism and one of the clutch mechanisms. The lever-operated type wheelchair of this invention has better operational capability in use for one-handed operation due to a fulcrum and a knob of the operational lever arranged so as to make the operation thereof easier.

2 Claims, 7 Drawing Figures

LEVER-OPERATED TYPE OF WHEELCHAIR

BACKGROUND OF THE INVENTION

1. Field of the Invention

The present invention relates to a wheelchair, and more particularly to an automotive wheelchair capable of running forward and backward and turning by means of an operating lever.

2. Prior Art

Conventionally, almost all manually operated wheelchairs are run by operating a ring fixed on the rim of a wheel. This type of wheelchair, however, cannot be run with one hand. Although a one-handed type wheelchair, which partly includes double rings formed on one side thereof, is available for use, it is extremely difficult to change direction within a narrow passageway, for example in a hospital, etc.

SUMMARY OF THE INVENTION

In light of the above-mentioned defect, the present invention makes it possible to run a wheelchair with one hand by means of an operational lever provided on the right or left side of the wheelchair.

In keeping with the principles of the present invention, the object is achieved by a unique structure including a differential link mechanism connected to an operation lever, a pair of forward/backward clutch mechanisms driven to interlock with the differential link mechanism and an expansion joint mechanism provided between the link mechanism and one of the above-mentioned clutch mechanisms.

Another object of the present invention is to provide a lever-operated type wheel chair with better operational capability in one-handed operation. This is accomplished by a fulcrum and a knob on the operational lever which are positioned so as to make the operation of the wheelchair of the present invention easier.

BRIEF DESCRIPTION OF THE DRAWINGS

The description of a preferred embodiment of the present invention will be apparent in conjunction with the accompanying drawings, wherein like reference numerals denote like elements, and in which.

DETAILED DESCRIPTION OF THE INVENTION

Figure 1:
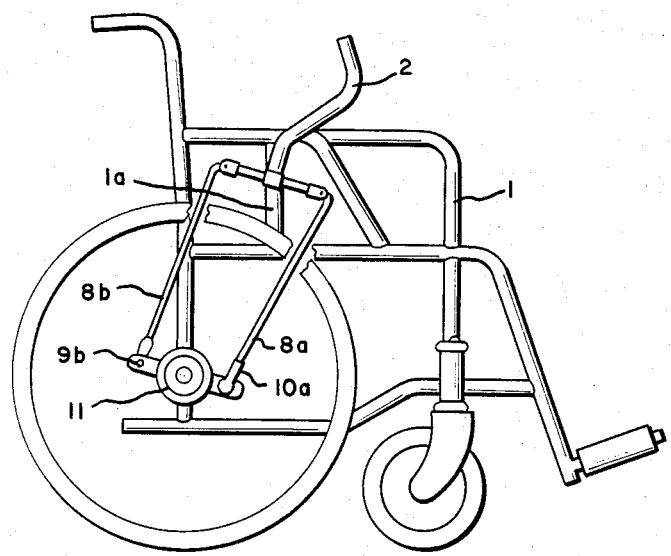
FIG. 1 is a side view of a wheelchair according to the present invention.
Figure 2:
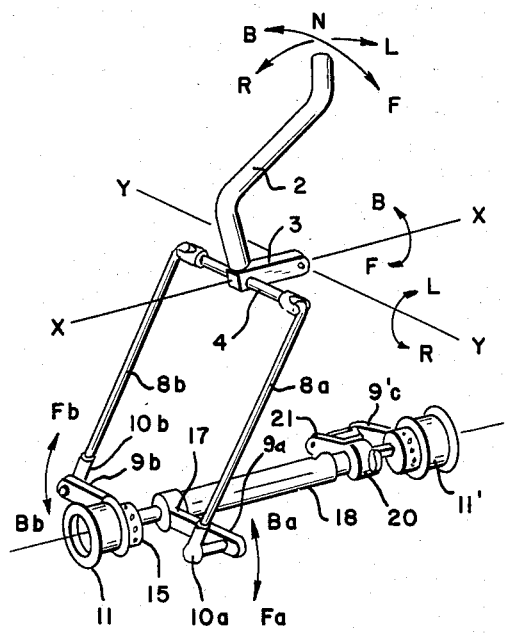
FIG. 2 is a persepective view of the mechanical part excluding the frame.

FIG. 1 is a side view of a lever-operated type of wheelchair provided by the present invention which specifically illustrates a right-handed operating type wheelchair. FIG. 2 is a perspective view of the mechanical part of FIG. 1 excluding the frame. The position of a frame pin $1b$ supporting an operational lever 2 is near the lower part of an elbow of the arm of the frame 1 in order to relieve fatigue in terms of human-factors engineering.

In FIG. 2, a component made by unifying a force by a longitudinal operation, F-B, of the operational lever 2 from its neutral position N and a force produced by a cross operation, R-L of the lever 2 makes it possible to run the wheelchair in any optical direction. Specifically, clutch hubs 11 and 11', coupled with right and left wheels by the actuation of the operation lever 2 in the F direction, are adapted to rotate in a forward direction through torque rods $8b$ and $8a$ of the differential link mechanism so that the wheelchair moves forward. On the other hand, when the operational lever is actuated in the B direction, the above-mentioned arrangement permits the clutch hubs 11 and 11' to rotate in a backward so that the wheelchair moves backward.

When the operational lever 2 is actuated in the R direction, the right wheel is adapted through the torque rod $8b$ to rotate to the $B_b$ side, causing a backward movement by the clutch hub 11; while the left wheel is adapted through the torque rod $8a$ to rotate to the $F_b$ side, causing a forward movement by the clutch hub 11', whereby the wheelchair turns to the right. When the operational lever 2 is actuated in the L direction, similarly to the foregoing, the right wheel is adapted to rotate to the $F_b$ side, causing a forward movement; while the left wheel is adapted to rotate to the $B_a$ side, causing a backward movement, whereby the wheelchair turns to the left.

The actuation of the lever 2 in any intermediate direction, e.g. between the forward movement F and the leftward movement L or between the backward movement B and the rightward movement R, is determined by a mechanical adjustment of the hubs 11 and 11' on the left and right sides of the torque rods $8a$ and $8b$. Namely, differences in the rotational amount between the left and right wheels and the adjustment of a component by unifying resultant rotational forces of the wheels permits the wheelchair to move in any optional direction.

Figure 3:
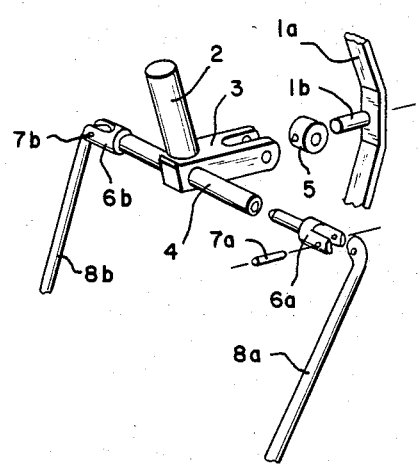
FIG. 3 is an exploded perspective view of a differential link mechanism.

FIG. 3 is an exploded perspective view of the differential link mechanism shown in FIG. 2. One end of a driving yoke 3 is connected at right angles with the base part of the operational lever 2 and with the middle point of a crossed shaft 4 crossing the operational lever 2. The bifurcated end of the yoke 3 is loosely inserted through a crossed bearing 5 into a frame pin $1b$ projecting at the position corresponding to the lower part of an elbow of a frame plate $1a$. Both ends of the above-mentioned crossed shaft 4 are loosely equipped with joint yokes $6a$ and $6b$ and are connected through coupling pins $7a$ and $7b$ inserted into the joint yokes $6a$ and $6b$ to the torque rods $8a$ and $8b$, respectively, which are positioned in a longitudinal direction.

As shown in FIG. 2, the torque rod $8b$ is directly connected through a rod end $10b$ with a moving arm $9b$ of the right clutch hub 11. The torque rod $8a$ is connected with the moving arm $9'c$ of the left clutch hub 11' through an expansion joint mechanism comprising a torque arm $9a$, a grooved pulley 17, a torque tube 18, an expansion shaft 20 and a crank arm 21.

Namely, when the operational lever 2 is moved in the F-B direction as shown in FIG. 2, the driving yoke 3 pivotally rotates about the X—X direction as a center. The movement of the lever 2 in the R-L direction permits the driving yoke 3 to pivotally rotate about the Y—Y axis as a center. In other words, every movement of the operational lever 2 can be modified by the foregoing differential mechanism with the moving arm 9b and the torque arm 9a.

Figure 4:
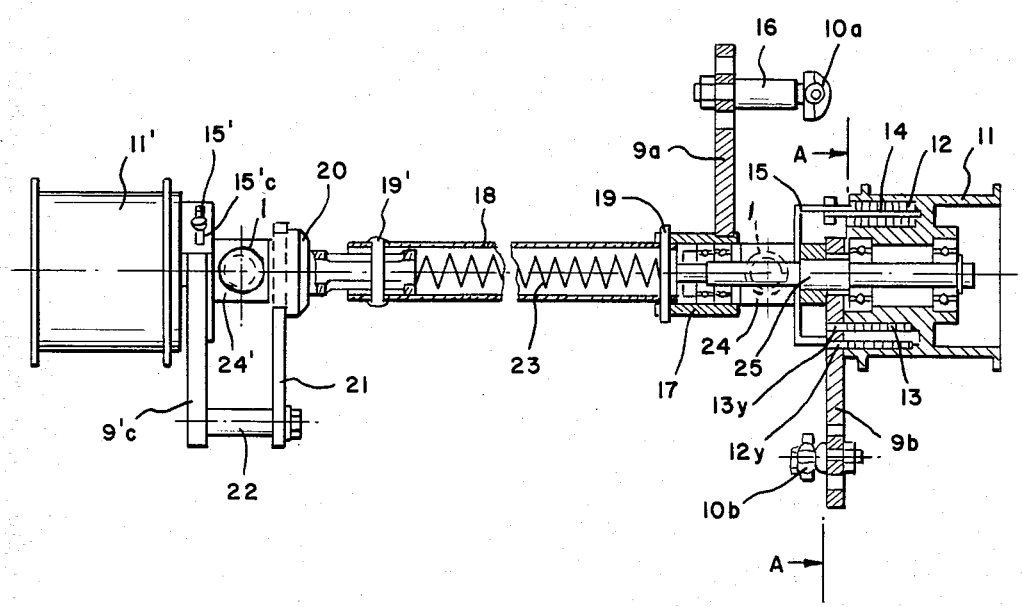
FIG. 4 illustrates a top view of the forward/backward clutch mechanism and an expansion joint mechanism.

FIG. 4 is a partially cutaway side view illustrating the state in which a forward/backward clutch mechanism is connected with an expansion joint mechanism. FIG. 5 is a sectional view, taken along the line A—A of FIG. 4, illustrating the state in which the clutch is actuated.

Figure 2A:
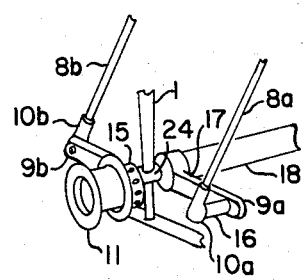
FIG. 2a is a partial perspective view similar to FIG. 2 illustrating the connection to the frame.

In FIGS. 2a, 4, 5a and 5b, annular grooves provided face-to-face in the cluth hub 11 rotating around a hub shaft 25, as a center, fixed to a frame bracket 24 by screws, have an outer spring 12 and an inner spring 13 fitted therein. The frame bracket 24, 24' is connected to frame 1 as shown in FIG. 2a and FIG. 4. One end of each spring 12 and 13 is radially equipped with projections 12x and 13x. The projections 12x and 13x, respectively, make contact with releases 14f and 14b adjustably fixed to the frame bracket 24 when the moving arm 9b fitted in the hub shaft 25 is located near the neutral position N. The other end of the spring 12 and 13 is axially equipped with projections 12y and 13y, which are inserted in holes made in the moving arm 9b rotating round the hub shaft 25 as a center.

Figure 5A:
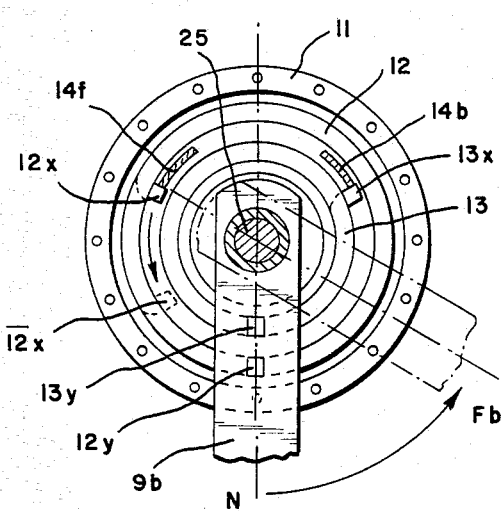
FIG. 5a illustrates a state in the section A—A of FIG. 4 wherein the forward operation is made.

Referring now to FIG.5a, when the moving arm 9b shifts in a direction from N to $F_b$, a resultant force is transferred to the annular groove provided along the inner face of the wall of the clutch hub 11 by the outer spring 12. The clutch hub 11 then rotates in the $F_b$ direction and, subsequently, the projection 12x of the outer spring 12 is moved to $\overline{12x}$, where the outer spring 12 stops, so that the outer spring 12 is rather closed, permitting the clutch hub 11 to overrun. That is, the wheelchair can take coasting by inertia. At that time the projection 13x of the inner spring 13 maintains in contact with the above-mentioned release 14b, and the inside diameter of the inner spring 13 is increased so that the connection of the inner spring 13 with the inner groove in the clutch hub 11 is cut off, whereby torque is not transferred from the inner spring 13 to the clutch hub 11.

Figure 5B:
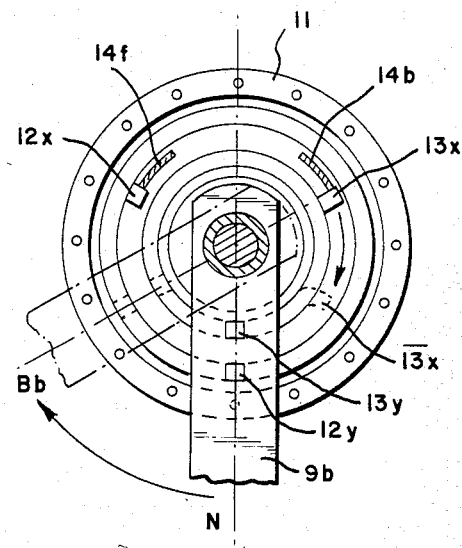
FIG. 5b illustrates the state in the section A—A of FIG. 4, wherein the back operation is made.

FIG. 5b illustrates a state in which the moving arm 9b is shifted in a direction from N to $B_b$. The function of the outer spring 12 and that of the inner spring 13 shown in FIG. 5a are reversed. The resultant force is transferred to the annular groove provided on the cylindrical outer wall of the clutch hub 11 by the inner spring 13. The clutch hub 11 then rotates in $B_b$ direction and, subsequently, the inner spring 13 stops so that the inner spring 12 is rather opened, permitting the clutch hub 11 to overrun. At that time the contact of the projection 12x of the outer spring 12 with the release 14f causes the outside diameter of the outer spring 12 to be decreased, similar to the foregoing, whereby the torque is not transferred from the outer spring 12 to the clutch hub 11.

Each of the releases 14f and 14b, which is provided in an optional position of a long hole provided on a release drum 15 fixed to the frame bracket 24, allows a clutch point to be adjusted. Reference numeral 15'c in FIG. 4 is a long groove provided in the release drum 15' on the opposite side of the drum 15.

Referring to FIG. 4, when the torque is transferred from the clutch hub 11 to the opposite clutch hub 11', the torque follows the course in sequence of: rod end 10a→stay bolt 16→torque arm 9a→grooved pulley 17→torque pin 19→torque tube 18→torque pin 19'→expansion shaft 20→crank arm 21→crank pin 22→moving arm 9c. The expansion joint mechanism indicated by the above-mentioned grooved pulley 17 through the expansion shaft 20 has a spring 23 in the torque tube 18 and, at the same time, couples separably to the torque pin 19 and the groove pulley 17. As a result, it is possible in one operation to collapse the frame when transportation of the wheelchair is required. In addition, any error in assembling the frame can be absorbed.

It is apparent from the foregoing that the present invention leads to ease in operating a wheelchair with one hand by positioning the operational lever to facilitate the operation thereof, displays effectiveness as a one-handed operating type wheelchair and produces a marked advantage as a rehabilitating apparatus. In addition to this, the wheelchair of the present invention has the same superior operational capability as expected when it is put into practical use.

It should be apparent to those skilled in the art that the above-described embodiments are merely illustrates of but a few of the many specific embodiments which represent the applications of the principles of the present invention. Numerous and varied other arrangements can be readily devised by those skilled in the art without departing from the spirit and the scope of the invention.

I claim:

1. A lever-operated wheelchair comprising:
   a wheelchair frame;
   a single operational lever;
   a differential link mechamism coupled to said lever, said link mechanism comprising:
   a driving yoke coupled at one end to a base part of said single operational lever;
   a frame pin provided on and extending from a side face of said frame;
   a crossed bearing for loosely couupling another end of said driving yoke to said frame pin;
   a crossed shaft having a middle point connected to said end of said driving yoke;
   a pair of joint yokes, one end of each yoke coupled to an end of said crossed shaft; and
   a pair of longitudinally arranged torque rods, one end of each torque rod coupled to another end of said joint yoke; and
   a pair of forward/backward clutch mechanisms comprising:
   a hub shaft coupled to brackets on said frame;
   clutch hubs provided on said hub shaft;
   moving arms pivotally coupled to said hub shaft, one end of said moving arms being coupled to another end of said torque rods;
   holes provided in another end of said moving arms;
   release drums fixed to one of said brackets of said frame;
   releases coupled to said release drums;
   an outer spring provided in said clutch hubs;
   an inner spring provided in said clutch hubs;
   projections formed on one end of said inner and outer springs inserted into said holes in said moving arm; and
   projections formed on another end of said inner and outer springs coupled to said releases;
   whereby operation of said single lever of said differential link mechanism operates said pair of clutch mechanisms.

2. A lever-operated type wheelchair according to claim 3, characterized in that said torque rod ends are coupled to said moving arms through an expansion joint mechanism.

* * * * *